United States Patent [19]

Menendez et al.

[11] Patent Number: 5,399,301
[45] Date of Patent: Mar. 21, 1995

[54] METHOD AND APPARATUS FOR EXPANDING REPLACEMENT PIPE

[76] Inventors: Hernan R. Menendez, 6420 Old Millington Rd., Millington, Tenn. 38053; Douglas K. Chick, Bays Hill Cottage, Barnet Lane, Elstree, Hertfordshire, England, WD6 3QU; Joseph Alexander, 1323 Glen Oaks, Memphis, Tex. 38119

[21] Appl. No.: 105,220

[22] Filed: Aug. 11, 1993

[51] Int. Cl.[6] .............................................. B29C 63/34
[52] U.S. Cl. ...................................... 264/36; 264/516; 264/269; 425/389; 425/392; 425/460
[58] Field of Search .......................... 264/36, 516, 269; 425/389, 392, 460

[56] References Cited

U.S. PATENT DOCUMENTS 4,950,446 8/1990 Kinumoto et al. .................. 264/269
5,244,624 9/1993 Steketee, Jr. ........................ 264/516

*Primary Examiner*—Mathieu D. Vargot

[57] ABSTRACT

A method and apparatus for expanding a replacement thermoplastic pipe installed within an existing conduit is provided. A pipe expansion apparatus having a flexible substantially cylindrical bladder and a relief valve to inflate the bladder to a predetermined gauge pressure and allow fluid to exit the expansion apparatus and fill and pressurize the area behind the apparatus is inserted within the collapsed pipe. Fluid, such as cold water, is introduced into the apparatus to inflate the inflatable section to conform substantially to the interior diameter and configuration of the existing conduit. As the area behind the expander fills with pressurized fluid, the expansion apparatus is pushed forward, thereby pushing and expanding the replacement pipe up against the interior of the existing conduit. Steam is injected ahead of the apparatus to maintain the replacement pipe in a heated flexible condition. When the fluid introduced into the expander is cold water, the replacement pipe will cool and become rigid almost immediately after it is expanded and significantly reduce stress formation.

18 Claims, 6 Drawing Sheets

METHOD AND APPARATUS FOR EXPANDING REPLACEMENT PIPE

BACKGROUND OF THE INVENTION

The invention relates generally to installing thermoplastic replacement pipe, and more particularly to a method and apparatus for rounding replacement pipe that is installed in an existing conduit in a reduced condition and is expanded to the interior dimensions of the existing pipeline.

The repair and rehabilitation of underground pipelines, such as sewerlines and other conduits is an important and widespread task. The NuPipe ® method for effecting such repair is described in U.S. Pat. Nos. 4,867,921 and 5,034,180, assigned to NuPipe, Inc. of Memphis, Tennessee. The contents of these patents which describe the installation of a replacement pipe formed of rigid thermoplastic material within an existing conduit are incorporated herein by reference. In the NuPipe ® process a replacement thermoplastic pipe in a flattened and folded form is stored on a reel. The pipe is heated at the installation site in order to make it flexible enough to be inserted into an existing manhole, pulled into place and then sequentially expanded to a round condition by internal pressure. This creates a tight fit against the original conduit being repaired. In this position the now rounded pipe is cooled to a rigid state while internal pressure is maintained, creating a permanent replacement pipe with lateral connections cut from within.

The NuPipe ® process of repair is advantageous for underground conduits because it requires little or no excavation and removal of the existing pipeline. It produces a pipe with the physical properties of a thermoplastic pipe of the same thickness and diameter. In addition, the NuPipe ® process does not materially reduce the diameter of the pre-existing conduit, eliminates annular space between the replacement pipe and the conduit, and eliminates the need for grouting. Thus, repair and rehabilitation can be accomplished in a convenient and effective manner with minimal disruption of traffic and commercial activity.

FIG. 1 illustrates the NuPipe ® process for an existing underground conduit 10 which extends between a pair of manholes 12 and 13 that provide access to conduit 10 from ground level 14. A length of rigid thermoplastic replacement pipe 22 in a flattened and folded (or in another reduced shape) reduced condition is brought to the installation site on a spool 24 in a trailer or a truck 26. Pipe 22 is heated to render it flexible and is pulled into existing conduit 10 by a pull cable 30 connected to a cable winch 28 adjacent to manhole 13. The reduced condition of thermoplastic replacement pipe 22 is a preferred configuration as described in connection with the NuPipe ® process and is illustrated in FIG. 2 within conduit 10. Thermoplastic pipe 22 is shown after expansion and rounding in FIGS. 3 and 6. Pipe 22 is typically heated and rendered flexible for insertion into the conduit by heating a spool 24 of folded pipe 22 within a housing 25 on vehicle 26 at the installation site.

After inserting pipe 22 in conduit 10, it can be expanded by several conventional methods. A first method involves installing a pair of plugs at opposite ends of the pipe and inflating the pipe with fluid, such as pressurized steam, hot water or hot air. Another method involves pulling a heated mandrel through the pipe.

Another embodiment of the NuPipe ® process involves installation with the use of a heat containment tube 16 as shown in FIG. 4. Heat containment tube 16 is a thin, flexible, tubular membrane installed between conduit 10 and pipe 22. Tube 16 can be manufactured from any material which is strong, pliable, air and water tight, and capable of withstanding live steam at high temperatures of up to 250° F. and substantial internal pressures. A suitable membrane for this purpose has been found to be a nylon reinforced polyethylene, 0.006 inches thick, although other suitable membrane material would also suffice, ranging in thickness from about 0.003 to 0.020 inches.

Installation using heat containment tube 16 is described in detail in U.S. Pat. No. 5,034,180. First, heat containment tube 16 can be pulled through a section of the existing conduit from manhole 12 to manhole 13 with some extra length of the tubing extending from each end of the section of conduit to be rebuilt. The diameter of tube 16 is preferably at least as great or greater than the inside diameter of existing conduit 10.

With tube 16 extending the full length of conduit 10, an end of tube 16 is temporarily connected to an air blower 18 and air is blown through tube 16 to expand it. With tube 16 expanded, heated and flexible folded replacement pipe 22 is pulled through heat containment tube 16 using winch 28 and cable 30.

With folded replacement pipe 22 in place within heat containment tube 16, a hot fluid, preferably steam, is introduced into an end of tube 16 while the opposite end of tube 16 is closed or restricted. If fluids need to be expelled or prevented from entering the existing conduit, steam or a combination of steam and air are injected into heat containment tube 16 in sufficient volume to maintain enough pressure within the tube to expel or prevent the entrance of such fluids.

If steam is used, a steam hose connected to a source of steam can be connected to an end of tube 16 and the other end can be tied shut. The steam is forced down through the length of tube 16 on the outside of folded pipe 22 and then back in the opposite direction through tube 16 but within folded pipe 22. Alternatively, the steam can be introduced initially into an end of folded pipe 22 and then passed back in the opposition direction on the outside of pipe 22 within tube 16. Another alternative is to restrict tube 16 at an end and allow the hot fluid inside both tube 16 and pipe 22. Each routing of the steam provides quick and effective full-length internal and external heating of pipe 22.

With thermoplastic replacement pipe 22 in a heated, flexible condition within tube 16, pipe 22 is rounded and expanded. If the heat containment tube 16 is supplied with a coating of compressible gasket material, a continuous seal is formed between the interior wall of existing conduit 10 and the exterior wall of the rounded and expanded pipe 22.

U.S. Pat. No. 5,034,180 describes the use of a heat containment tube and a expansion device. The expansion device is propelled through the collapsed pipe by forcing steam behind the expansion device and permitting some steam to flow past the expansion device so that the entire thermoplastic pipe remains heated during expansion. Other methods can involve pulling a heated mandrel through the installed pipe. The pipe is then permitted to cool under internal fluid pressure to prevent it from collapsing.

These known methods for expanding and rounding the thermoplastic replacement pipe all utilize a heated fluid to provide internal pressure and thus have drawbacks. A considerable amount of steam is required and this increases energy costs and risk of injury. The use of hot fluid also leads to expansion, compression and thermal shrinkage induced tensile stresses built up in the expanded pipe, which can result in the formation of cracks. Accordingly, it is desirable to provide a new method and apparatus for expanding a thermoplastic replacement pipe within an existing conduit which overcomes these shortcomings.

SUMMARY OF THE INVENTION

Generally speaking, in accordance with the invention, a method and apparatus for expanding replacement pipe installed within an existing conduit are provided. A pipe expanding or rounding device having a flexible expansion chamber defined by a flexible bladder is inserted within the collapsed pipe. Fluid, such as cold water, is introduced into the expansion chamber to inflate the flexible bladder to conform substantially to the interior diameter and configuration of the existing conduit to be lined. The expansion chamber includes a pressure regulating valve permitting inflation to a predetermined pressure differential, at which point the fluid exits the expansion chamber to fill and pressurize the area behind the pipe expansion apparatus. The pressurized fluid behind the pipe expansion apparatus forces the expanding device, which can be restrained, forward through the collapsed replacement pipe to expand the replacement pipe against the existing conduit. Steam can be injected over and along the collapsed pipe ahead of the expansion apparatus to maintain the replacement pipe in a heated flexible condition during the rounding operation. If the fluid introduced into the pipe expansion apparatus is cold liquid, the replacement pipe will cool and become rigid almost immediately after it is expanded and minimize unwanted stress within the replacement pipe.

Accordingly, it is an object of the invention to provide an improved method and apparatus for expanding replacement pipe positioned within an existing conduit.

Another object of the invention is to expand thermoplastic replacement pipe within an existing conduit without use of a heated fluid, such as pressurized steam.

A further object of the invention is to provide a method for expanding and rounding a replacement pipe from a reduced form with a cold liquid.

Yet another object of the invention is to expand replacement pipe within an existing conduit while creating less stress and fewer cracks within the installed replacement pipe.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF DRAWINGS

For a fuller understanding of the invention, reference is had to the following description taken in connection with the accompanying drawings, in which.

DESCRIPTION OF THE PREFERRED EMBODIMENTS

Figure 1:
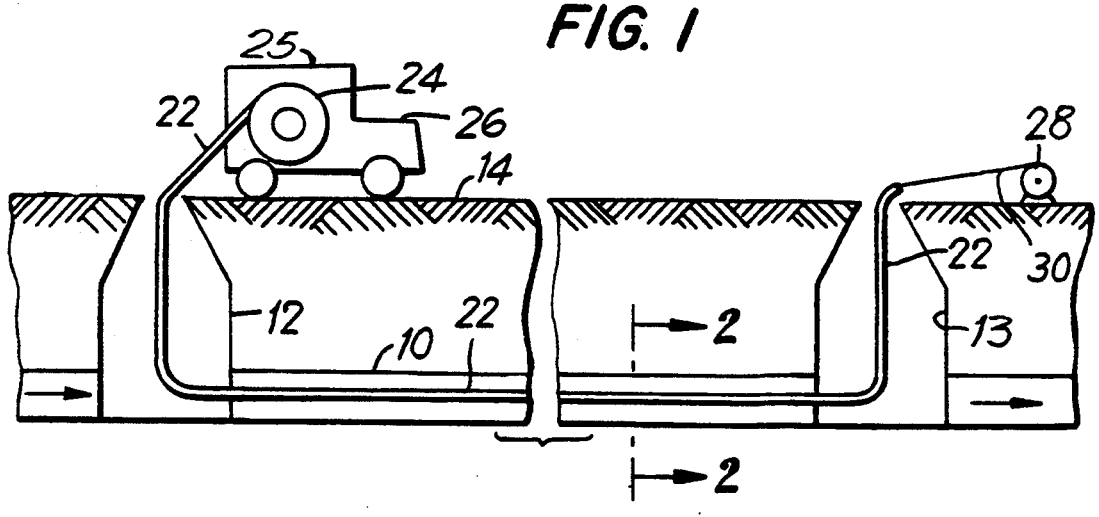
FIG. 1 is a schematic diagram illustrating the installation of a rigid thermoplastic replacement pipe in an existing conduit.
Figure 3:
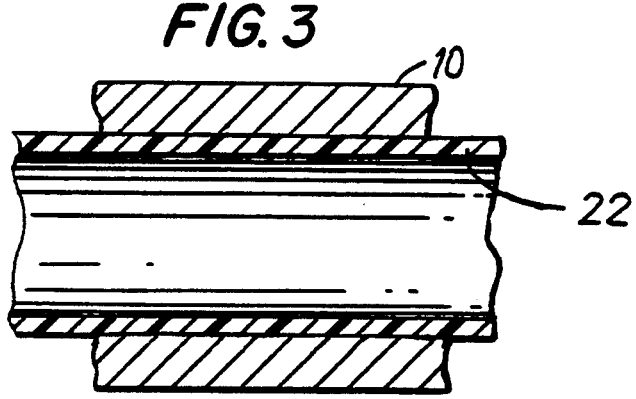
FIG. 3 is a cross-sectional view of the pipe of FIG. 2, in a fully expanded condition.
Figure 2:
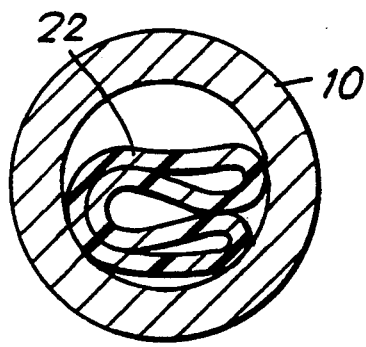
FIG. 2 is a longitudinal cross-sectional view of the conduit and pipe of FIG. 1 taken along line 2—2, before the pipe is expanded.
Figure 4:
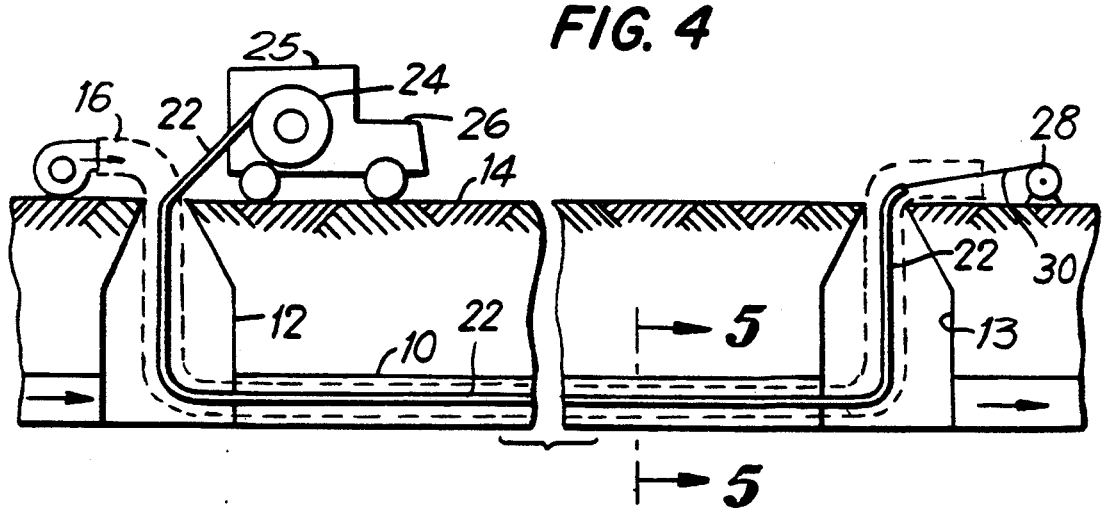
FIG. 4 is a schematic diagram illustrating the installation of a rigid thermoplastic replacement pipe in an existing conduit in accordance with another embodiment of the invention.
Figure 5:
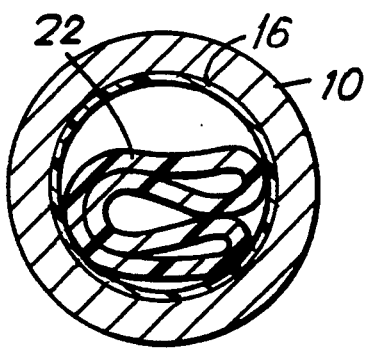
FIG. 5 is a cross-sectional view of the unexpanded pipe of FIG. 4 within a heat containment tube and conduit taken along line 5—5.
Figure 6:
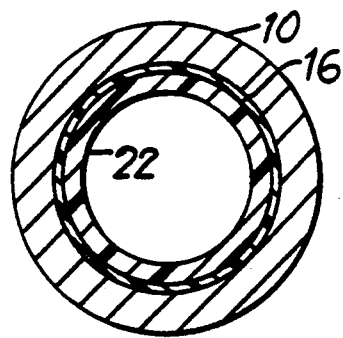
FIG. 6 is a cross-sectional view of the conduit, heat containment tube and pipe of FIG. 5 in a fully expanded condition.

A pipe expansion apparatus constructed in accordance with the invention includes a rounding portion including an inflatable bladder for expanding the replacement pipe to a fully expanded shape or to the configuration of the existing conduit to be repaired. The pipe expansion apparatus is propelled through the replacement pipe due to fluid pressure behind the apparatus. This forces the expansion apparatus forward to progressively expand the replacement pipe while maintaining pressure behind the expansion apparatus to stabilize the expanded pipe in an expanded shape, corresponding to the shape of the original conduit.

The rounding portion of the apparatus is flexible and/or inflatable and the fluid is preferably cold water. A check or relief valve on the expansion apparatus regulates the fluid pressure introduced into the expansion apparatus for inflating the rounding portion to a desired gauge pressure. When the desired pressure is reached, the region behind the expansion apparatus fills to force the apparatus forward and maintain the replacement pipe in an expanded condition.

The use of a constant water supply and a relief valve has advantages. If the bladder has a leak, it will maintain its inflated condition and the rounding process does not have to be abandoned. If the apparatus reaches a region of difficult passage and extra water pressure is needed to push the apparatus through the pipe, the required extra pressure will not crush the bladder and permit water to leak past the apparatus and cool the hot and pliable pipe ahead of the expansion apparatus.

It is preferable to expand the pipe while it is in a hot and pliable state. Thus, steam or other hot fluid should be maintained ahead of the expansion apparatus along the outside of the length of collapsed replacement pipe. In this manner, the front of the expansion apparatus is forced against and rounds the hot and pliable pipe. As the newly expanded pipe is contacted by the cold fluid behind the expansion apparatus, it will cool and become rigid in the expanded position. The progressive cooling is useful because as the pipe cools and becomes rigid, it will experience slight longitudinal contraction. If the pipe ahead of the apparatus is hot and pliable, it can shift in position to compensate for the contraction and reduce thermally induced residual internal stresses that can be created as the thermoplastic pipe cools. If the entire length of pipe is cooled all at once, stresses caused by this contraction will not be relieved.

An apparatus for expanding installed pipe constructed in accordance with a preferred embodiment of the invention is shown generally in FIGS. 7-10 as pipe expansion apparatus 100. Expansion apparatus 100 includes a flexible rounding portion 60, preferably in the form of an inflatable bladder or bag 69 formed of heat resistant flexible or elastic material. Preferred materials include elastomeric materials such as rubber and reinforced rubber. Bladder 69 can also be covered with canvas or other abrasion resistant material. Regardless of the material selected, it should be able to form a water tight seal with pipe 22 and slide through the pipe easily. A particularly preferred bladder can be formed from silicone rubber hose with a uniform cylindrical cross-section. An ⅛ inch thickness is suitable for expanding an 8 inch diameter pipe. The nominal diameter of the hose should approximate that of the pipe to avoid the need for excessive expansion of the bladder when it is inflated to eliminate wrinkling which might allow fluid leakage between the bladder and the pipe.

Bladder 69 is coupled to a nose piece 70 and a fluid control housing 80. Nose piece 70 and fluid control housing 80 are coupled by a suitable attachment mechanism 65. Attachment mechanism 65 can be formed of cable, chain or other suitable material for maintaining nose piece 70 and fluid control section 80 at a fixed maximum distance apart so that when bladder 69 inflates, it expands radially, rather than longitudinally.

Figure 9:
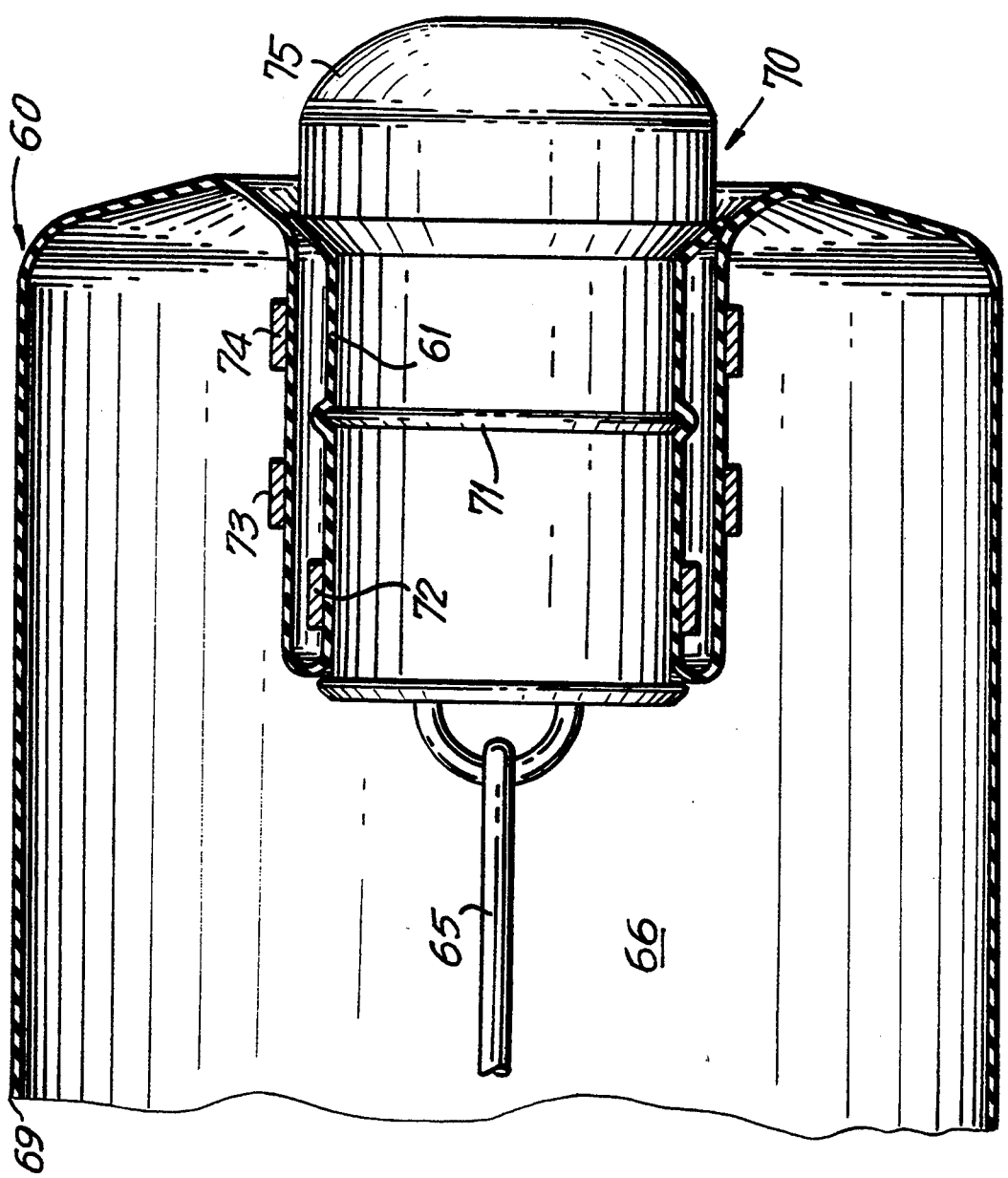
FIG. 9 is a partial view of the pipe expansion apparatus of FIG. 7, with the inflatable portion shown in cross-section and the remainder shown in perspective view.

Referring to FIG. 9, nose piece 70 is formed in a generally cylindrical shape and includes a dome portion 75 at the front end thereof. Nose piece 70 is preferably formed of metal or other suitable rigid material. Dome 75 must be heat resistant and sufficiently smooth to prevent tearing or other damage to heated and flexible replacement pipe 22.

Nose piece 70 is generally cylindrical in shape and includes at least one rib 71. Bladder 69 is attached to nose piece 70 by sliding a front end 61 of bladder 69 over nose piece 70 including rib 71 and wrapping a band 72 around end 61 on the rear side of rib 71. First end 61 of bladder 69 is then doubled back on itself and further secured by a pair of bands 73 and 74, positioned on both sides of rib 71. The configuration shown in FIG. 9 is advantageous, because it permits a secure pressure tight attachment between bladder 69 and nose piece 70 and enables bladder 69 to expand under pressure in a radial direction from dome 75 without being removed from nose 70. Other methods of securing front end 61 to nose piece 70 that will maintain sufficient pressure will be apparent to those of ordinary skill in the art and are also acceptable.

Figure 10:
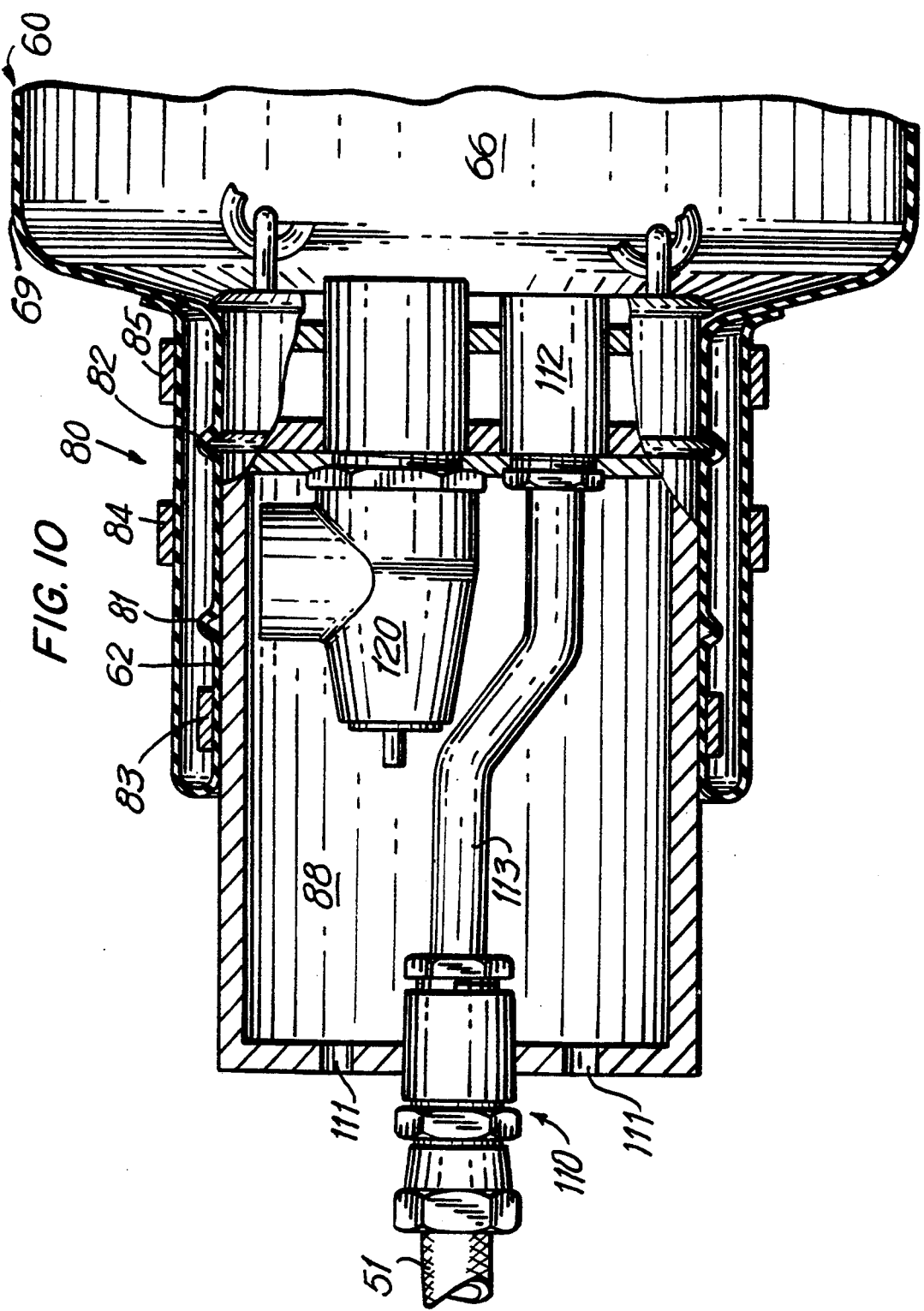
FIG. 10 is a partial cross-sectional view of the pipe expansion apparatus of FIG. 7, with certain valves and fittings shown in perspective.

Fluid control housing 80 is at the rear end of apparatus 100 and is shown generally in FIG. 10. Housing 80 is formed of metal or another suitably rigid material and is generally cylindrical in shape with a substantially hollow fluid chamber 88. Fluid control housing 80 includes a pair of external ribs 81 and 82 to assist in securing a rear end 62 of bladder 69 thereto. Rear end 62 of bladder 69 is slid over ribs 81 and 82 and is then secured to fluid control housing 80 by a band 83. Rear end 62 is then doubled back over band 83 as well as ribs 81 and 82 and further secured by a pair of bands 84 and 85. Bands 83, 84 and 85 are similar in construction to bands 72, 73 and 74. Other methods of attaching bladder 69 to housing 80 that will permit pressure build up and rough handling will be apparent to those of ordinary skill in the art and are also acceptable.

Fluid control housing 80 regulates the gauge pressure in bladder 60 and includes a fluid inlet port 110 coupled to a fluid supply hose 51 and a plurality of fluid outlet holes 111 at the rear thereof. Fluid control housing 80 also includes a fluid inflation port 112 in fluid communication with an interior fluid chamber 88 of fluid control housing 80 and an interior region 66 of rounding portion 60. A hose 113 or other suitable conduit is used to transport fluid from supply hose 51 through fluid chamber 88 to interior 66.

Fluid control housing 80 also includes a pressure control mechanism such as a check or relief valve 120 in fluid communication with both interior 66 of rounding portion 60 and fluid chamber 88. By selecting an appropriate gauge pressure for relief valve 120, such as about 2 to 40 psi, preferably 6 to 18 psi, most preferably about 15 psi, fluid introduced into interior 66 will inflate rounding portion 60 to the selected gauge pressure and then begin to exit from interior 66 of rounding portion 60 into chamber 88. Consequently, regardless of the pressure on rounding portion 60 from fluid behind apparatus 100, the pressure within rounding portion 60 will always be a selected level higher and will not collapse from such pressure.

Figure 7:
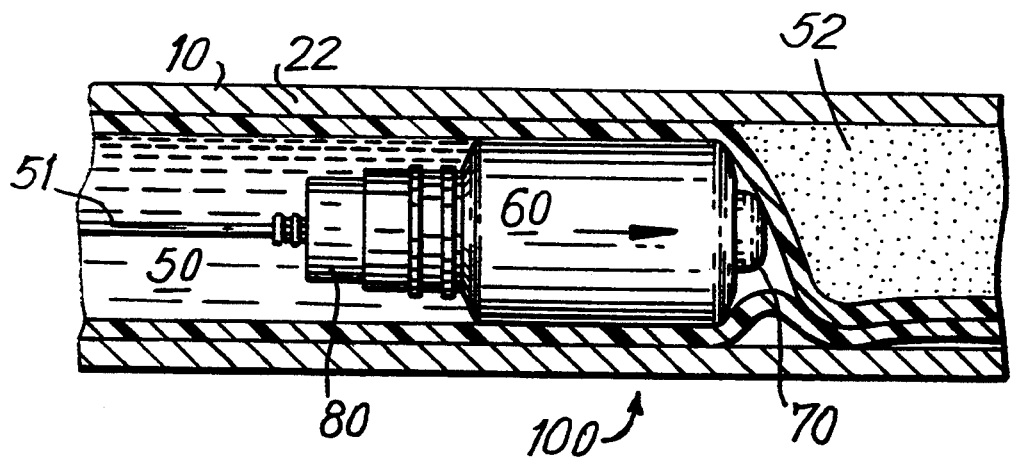
FIG. 7 is a perspective view of a replacement pipe expansion apparatus constructed in accordance with an embodiment of the invention within a replacement pipe shown in cross-section and illustrates a method of expanding a replacement pipe in accordance with an embodiment of the invention.
Figure 8:
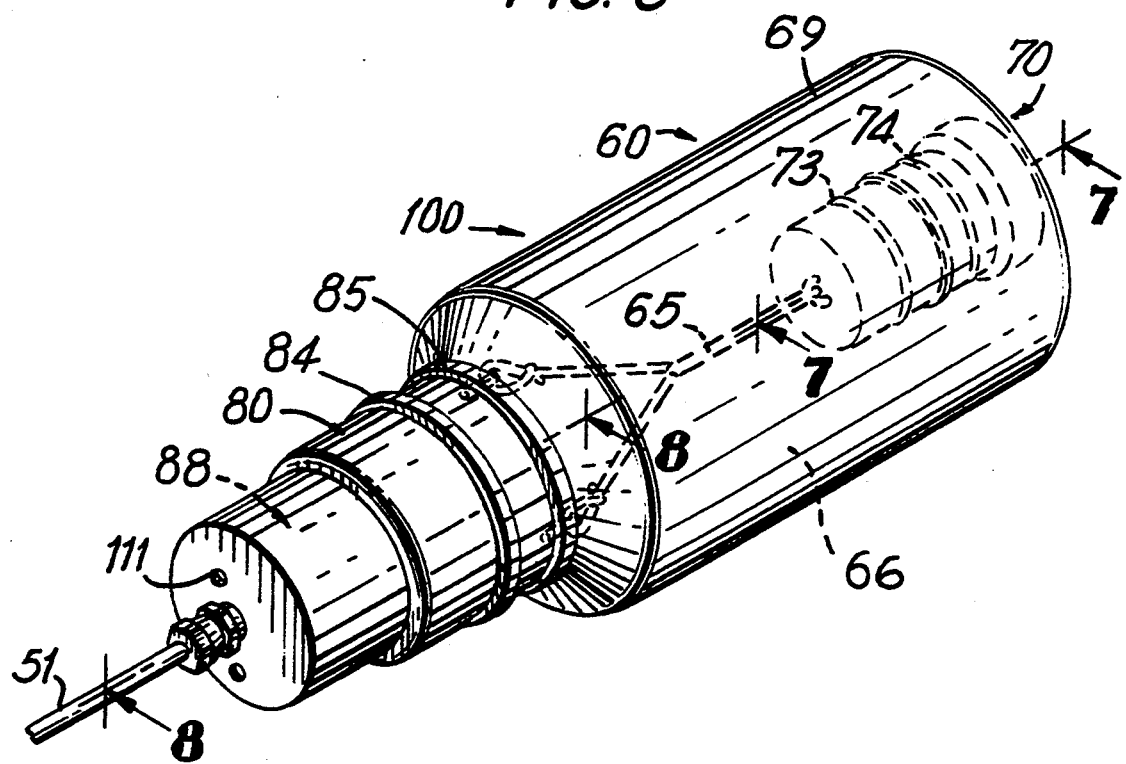
FIG. 8 is a perspective view of the pipe expansion apparatus of FIG. 7.

As fluid continues to flow from hose 51 into interior 66 and out of valve 120, it will fill chamber 88 of fluid control housing 80 and then exit through fluid exit ports 111. The fluid will then fill the interior of replacement pipe 22 behind pipe expansion apparatus 100. FIG. 7 shows how expanded pipe 22 behind apparatus 100 is filled with water 50, which pushes apparatus 100 forward to round pipe 22. In order to speed the rounding process, additional water 50 can be pumped behind apparatus 100. However, the extra pressure will not cause fluid to seep past rounding portion 60 because bladder 69 will always be inflated to a higher pressure than water 50 behind it due to relief valve 120.

Figure 11:
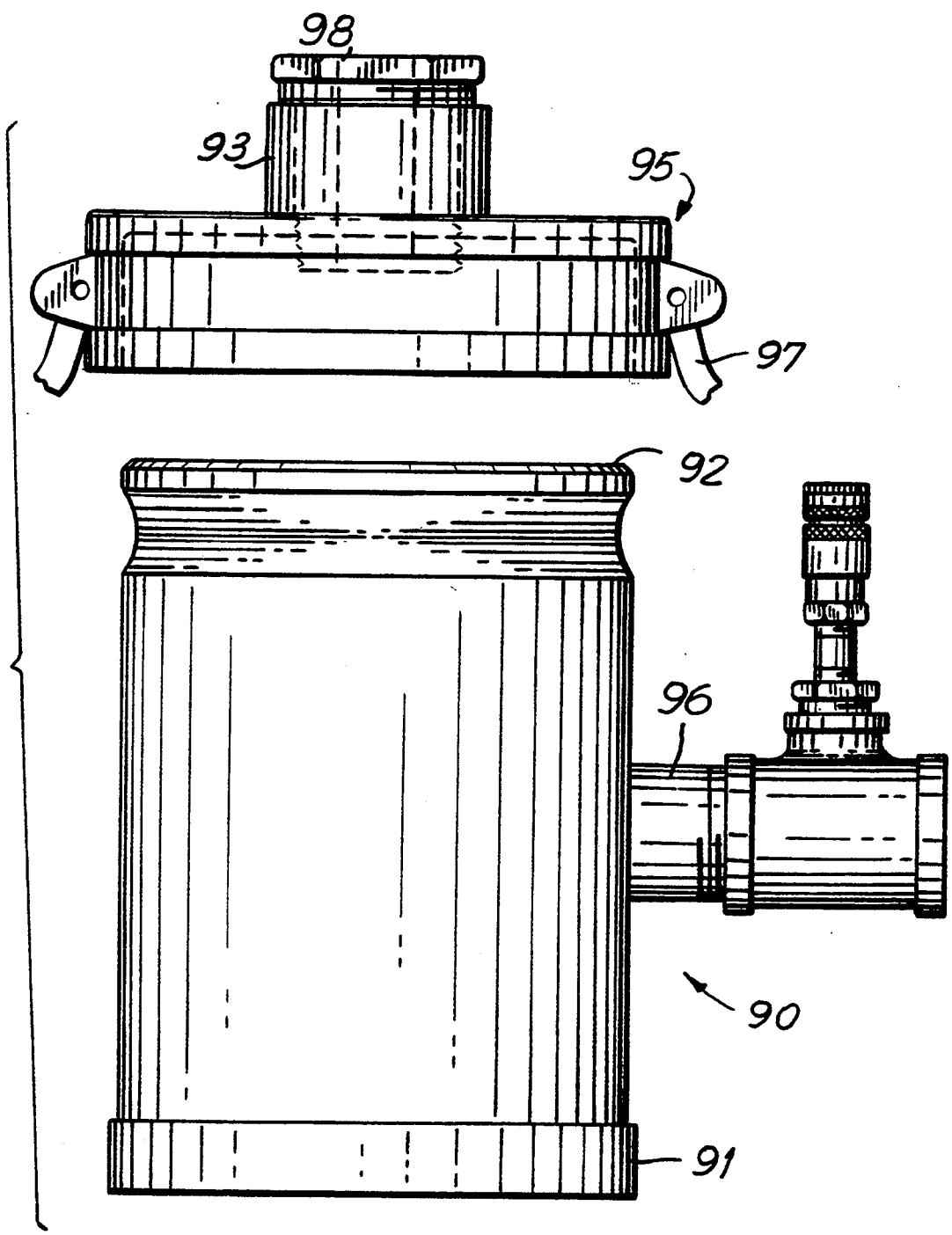
FIG. 11 is a perspective view of a launcher and end cap for launching the pipe expansion apparatus of FIG. 7, formed in accordance with the invention.

In order to expand replacement pipe 22 in accordance with an embodiment of the invention, folded pipe 22 is positioned within existing pipeline 10 and is then ready to be expanded. A launcher fitting 90 shown in FIG. 11 can be installed into the trailing end of replacement pipe 22 which has been heated and mechanically rounded. Launcher 90 is formed to the approximate dimensions of fully expanded pipe 22 and includes a front end rib 91 to be inserted within expanded replacement pipe 22 and facilitate securing pipe 22 thereto. Launcher 90 includes a trailing end 92 for receiving an end cap 95. Launcher 90 also includes a fitting 96 for receiving or venting fluids such as steam or water. Launcher 90 is preferably formed of metal or other suitable rigid and heat resistant material.

After launcher 90 is inserted into pipe 22, a closed end cap 95 is coupled to a trailing end 92 of launcher 90 and a heating fluid such as hot steam is injected under pressure into the leading end of conduit 10 to maintain replacement pipe 22 in a flexible and pliable state. Exiting steam is vented through fitting 96. In an embodiment of the invention a heat containment tube 16 as described above and in U.S. Patent No. 5,034,180 is used. In this case, steam is introduced into the downstream end of tube 16 and the upstream end is banded onto launcher 90 outside pipe 22. An opening is made in the upstream end to permit the steam to vent. Thus, the steam vents simultaneously through the opening and through fitting 96.

End cap 95 includes a clamping mechanism 97 for releasably securing end cap 95 to launcher 90 with a cam lock arrangement. End cap 95 also includes an inlet port 93 including a packing gland 98 for receiving water hose 51 and permitting water hose 51 to slide sealingly therethrough while maintaining sufficient pressure within launcher 90. Packing gland 98 can include graphite cord compression style packing.

With end cap 95 removed, water supply hose 51 is passed through packing gland 98 of inlet 93 and is attached to expansion apparatus 100 at inlet port 110. Expansion apparatus 100 is then inserted into launcher 90 and end cap 95 is installed thereon with clamps 97. Cold water is then supplied through hose 51 which inflates rounding portion 60 and urges expansion apparatus 100 forward to expand replacement pipe 22 as cold water first inflates rounding portion 60 and then exits through outlet ports 111 into the region between end cap 95 and apparatus 100. Additional cold water can be supplied through fitting 96 of launcher 90 to supply additional volume to push expansion apparatus 100 along pipe 22, unfolding, progressively rounding, expanding and cooling pipe 22. Sufficient fluid pressure should be maintained behind expansion apparatus 100 to keep pipe 22 expanded until it is cooled.

The rate at which expansion apparatus 100 progresses through pipe 22 can be controlled by maintaining a restraining force on hose 51, which should be reinforced. Throughout the progressive rounding of pipe 22, steam 52 shown in FIG. 7 or some other heating means is preferably maintained ahead of expansion apparatus 100 to keep expandable pipe 22 hot and pliable prior to rounding and cooling.

The method and apparatus for rounding pipe 22 using a cold fluid as described herein has several advantages. Replacement pipe 22 is rounded progressively from the trailing end to the leading end so that any fluid in existing conduit 10 is expelled ahead of the unfolding and expanding pipe 22, rather than being trapped as bubbles between pipe 22 and conduit 10. The expansion and cooling adjacent hot and pliable pipe also reduces residual stresses from remaining, because the hot side of the expansion apparatus can shift to compensate for contractions on the cold side. Apparatus 100 is advantageous because it will have sufficient flexibility to negotiate irregularities and curves in existing pipeline 10. However, it will provide sufficient pressure to properly expand and round pipe 22 and prevent water from seeping to and cooling the unexpanded pipe.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for expanding a replacement pipe which has been installed in an existing conduit from a collapsed condition wherein the cross-sectional dimensions are less than when the pipe is round to an expanded condition to conform to the interior of the existing conduit, comprising:

expanding a portion of the collapsed pipe at one end;

inserting an expansion apparatus into the expanded end of the pipe, the expansion apparatus capable of being inflated to a selected pressure by a fluid supplied thereto;

maintaining the unexpanded pipe ahead of the expansion apparatus in a flexible condition;

pressurizing the expansion apparatus from behind by supplying fluid to the expansion apparatus to cause it to inflate to a selected pressure and pressurizing the region behind the expansion apparatus;

supplying fluid to the expansion apparatus to maintain the selected pressure of the expansion apparatus above the pressure of fluid behind the expansion apparatus and to force fluid out of and behind the expansion device;

forcing the expansion apparatus through the unexpanded pipe by pressurizing the region behind the expansion apparatus with fluid to expand the collapsed pipe progressively as the expansion apparatus travels forward.

2. The method of claim 1, including supplying cold water as the pressurizing fluid.

3. The method of claim 1, including inflating the expansion apparatus to a pressure of between about 2 to 40 psi above the pressure of fluid behind the expansion apparatus.

4. The method of claim 1, including supplying additional water behind the expansion apparatus to provide additional force to push the expansion apparatus forward and expand the pipe.

5. The method of claim 1, including maintaining a water tight seal between the expansion apparatus and the pipe.

6. The method of claim 1, including mechanically rounding a trailing end of the pipe and inserting a substantially cylindrical housing into the rounded end; providing an end cap for the housing; inserting a hose through the end cap and coupling the hose to the expansion apparatus; inserting the expansion apparatus into the cylindrical housing; coupling the end cap over the housing with the expansion apparatus within the housing and the pipe; supplying fluid under pressure through the hose into an interior region of the expansion apparatus and out of the expansion apparatus to pressurize the region between the expansion apparatus and the end cap.

7. The method of claim 6, including controlling the movement of the expansion apparatus through the pipe by applying a restraining force to the expansion apparatus.

8. The method of claim 6, including adding additional fluid into the region between the end cap and the expansion apparatus.

9. A pipe expanding apparatus for expanding a pipe from a collapsed condition to an expanded condition, comprising:

inflation chamber means for expanding the collapsed pipe as it advances forward through the collapsed pipe having a front portion and a rear portion and a substantially cylindrical flexible bladder extending from the rear to the front for defining an inflatable interior chamber, the inflation chamber means including an inlet to the interior chamber for receiving fluid under pressure for inflating the bladder and an outlet for allowing fluid to exit the interior chamber rearward of the inflation chamber means; and pressure control means on the inflation chamber means for controlling pressure within the interior chamber and for allowing fluid to exit the interior chamber through the outlet when a selected pressure drop exists between the fluid within the interior chamber and fluid rearward of the inflation chamber means.

10. The apparatus of claim 9, wherein the flexible bladder is formed from an elastomeric material.

11. The apparatus of claim 10, wherein the elastomeric material is silicone rubber.

12. The apparatus of claim 9, wherein the rear portion includes a substantially rigid rear housing having a hollow portion and a conduit to transport fluid through the hollow portion to the interior chamber and the pressure control means permits fluid to exit the interior chamber into the hollow portion of the rear housing, the rear housing constructed to permit fluid to exit the hollow portion into the pipe behind the rear end.

13. The apparatus of claim 9, wherein the pressure control means includes a pressure relief valve.

14. The apparatus of claim 12, including restraining means coupled to the housing in a manner to restrain the apparatus as it advances through the expanded pipe.

15. The apparatus of claim 14, wherein the restraining means is a reinforced hose for supplying fluid to the conduit.

16. The apparatus of claim 12, wherein the front end includes a substantially rigid nose and the nose and rear housing are coupled together to maintain the nose and rear housing a maximum distance apart and the inflation chamber means is constructed and arranged so that the bladder will expand in a substantially radial direction when inflated.

17. The apparatus of claim 16, wherein the nose and rear housing each include substantially cylindrical portions each having at least one external rib and the bladder is substantially cylindrical and a rear end and a front end of the bladder are doubled over the cylindrical portion of the housing and nose respectively and secured over the rib.

18. An apparatus for expanding pipe from a collapsed condition to an expanded condition, comprising:

inflation chamber means defined by a substantially rigid rear housing and a substantially rigid front nose and a substantially cylindrical flexible wall extending from the rear housing to the nose for receiving fluid under pressure, the nose and housing maintained a selected maximum distance apart so that the flexible wall will expand in a radial direction when inflated and an inlet and an outlet on the rear housing for receiving fluid under pressure for inflating the chamber means; and pressure control means at the outlet for controlling pressure within the interior of the chamber means and allowing fluid to exit the chamber means through the outlet as the inflated flexible wall expands the collapsed pipe as it advances forward through the collapsed pipe;

a launcher housing of substantially the interior diameter of the pipe in a fully expanded position;

an end cap releasably secured to a rear end of the launcher housing; and inlet means for supplying water under pressure to the interior of the launcher housing so that when the launcher housing is inserted into the end of the pipe, the water flows into the interior of the pipe.

* * * * *

UNITED STATES PATENT AND TRADEMARK OFFICE
CERTIFICATE OF CORRECTION

PATENT NO. : 5,399,301
DATED : March 21, 1995
INVENTOR(S) : Menendez, et al.

It is certified that error appears in the above-indentified patent and that said Letters Patent is hereby corrected as shown below:

On the cover page, Item

--[73] ASSIGNEE: NuPipe, Inc., Memphis, Tenn.-- before the line "[21] Appln. No.: 105,220"; and at the bottom of the first column add --Attorney, Agent or Firm - Michael I. Wolfson--.

Signed and Sealed this

Twenty-seventh Day of June, 1995

Attest:

BRUCE LEHMAN

Attesting Officer     Commissioner of Patents and Trademarks